(12) United States Patent
Harju

(10) Patent No.: US 6,349,605 B1
(45) Date of Patent: Feb. 26, 2002

(54) RECIPROCATABLE AXIAL-TO-ROTOR MOTOR

(75) Inventor: Bert Harju, Harads (SE)

(73) Assignee: Pos-Line AB, Staffanstorp (SE)

( * ) Notice: Subject to any disclaimer, the term of this patent is extended or adjusted under 35 U.S.C. 154(b) by 0 days.

(21) Appl. No.: 09/522,454

(22) Filed: Mar. 8, 2000

Related U.S. Application Data

(63) Continuation of application No. PCT/SE98/01512, filed on Aug. 24, 1998.

(30) Foreign Application Priority Data

Sep. 8, 1997 (SE) ................................................ 9703229

(51) Int. Cl.⁷ ................................................ F16H 29/00
(52) U.S. Cl. .......................................... 74/165; 74/126
(58) Field of Search ........................... 74/126, 164, 165

(56) References Cited

U.S. PATENT DOCUMENTS

| | | | |
|---|---|---|---|
| 182,199 A | * | 9/1876 | Joslin ........................... 74/165 |
| 220,385 A | * | 10/1879 | Joute ........................... 74/165 |
| 1,774,356 A | | 8/1930 | Cloud |
| 2,564,608 A | | 8/1951 | Robbins |
| 2,911,835 A | * | 11/1959 | Smith ............................. 74/37 |
| 4,018,094 A | * | 4/1977 | Schmidt ....................... 74/128 |

FOREIGN PATENT DOCUMENTS

| | | |
|---|---|---|
| SE | 433 393 | 5/1984 |

* cited by examiner

*Primary Examiner*—David A. Bucci
*Assistant Examiner*—Vicky A. Johnson
(74) *Attorney, Agent, or Firm*—Larson & Taylor PLC

(57) ABSTRACT

An axial-to-rotary motor includes a double acting pneumatic motor of piston-cylinder type. An endless drive belt extends over a first pulley, which is fixed mounted in relation to the pneumatic motor, and over a second pulley mounted spaced from the piston rod. The motor further includes one or more output shafts arranged for being continuously rotated. The piston rod end of the pneumatic axial motor is connected to a yoke which, with the outer frames thereof, encloses the two paths of the drive belt, and which encloses a ratchet device which provides a drive force against one of the drive belt paths at the active expelling stroke of the piston rod. The yoke also provides a drive force against the second drive belt path at the retraction stroke of the piston rod, whereby the drive belt will move in one and the same direction at both piston movement directions.

20 Claims, 3 Drawing Sheets

RECIPROCATABLE AXIAL-TO-ROTOR MOTOR

The present application is a continuation of PCT/SE98/01512 filed Aug. 24, 1998 which designated the US.

FIELD OF THE INVENTION

The present invention generally relates to an apparatus for transforming a reciprocating axial movement of a pneumatic motor, a gas motor or a hydraulic motor of piston-cylinder type to a continuous rotary movement of one or more output shafts, and the invention is more particularly directed to an axial-to-rotary motor, in which there is used an endless drive belt extending over a first pulley which is fixed mounted in relation to the cylinder part of the pneumatic motor and over a second pulley which is mounted spaced from the piston rod, and in which the piston rod end of the reciprocatable motor is connected to a yoke having outer frames which enclose the two paths of the drive belt, and which includes a ratchet means which at the active expelling stroke of the piston provides a driving against one of the drive belt paths, and which at the retraction stroke of the piston provides a driving action against the second drive belt path, so that the drive belt, in both moving directions of the piston, will move in one and the same direction, and so that the shafts of the two pulleys will rotate in one and the same direction. A rotary drive movement thereby can be received, and taken out from one of the two shafts of the drive pulleys, or from both shafts.

BACKGROUND OF THE INVENTION

An apparatus for transforming a reciprocating axial movement to a rotating movement, or vice versa, is known from the Swedish laid out publication No 433,393, which discloses an axial-to-rotary transforming apparatus, in which an endless cog belt is actuated by a reciprocatably moveable slide comprising a ratchet wheel having three ratchet segments provided at an angle of 120° in relation to each other, and each comprising several cogs for co-operation with the cog belt and adapted to rotate a certain distance at each end position, whereby the cogs change contact from one cog belt path to the other cog belt, path.

The said known apparatus is disadvantageous in that the cog belt is moving at the moment when the ratchet wheel changes contact between the two cog belt paths, whereas the slide is still standing, and this leads to a non-desired play position of the rotary movement. The apparatus is also not formed for being used in combination with a pneumatic piston-cylinder apparatus.

BRIEF SUMMARY OF THE INVENTION

In the present invention the driving is made from the shaft end of the axially reciprocatable motor, and it is the drive power from the cylinder that controls the changing operation while the piston rod is moving with maximum one cog difference. When the coupling means of the yoke has come to an engagement, the engagement force is controlled by the counter force, meaning the actual load on the output rotary shaft. This is done in that one or more ratchets of the coupling means clamps the drive belt against the inner surface of the yoke. The greater a force is needed the greater a force is applied between the ratchet and the yoke. Thanks to this structure it is possible to provide a fully acceptable function even when using a smooth or only slightly chamfered drive belt, for instance a reinforced drive belt having a rough surface, or even a conventional V-belt.

Thus, according to the invention the piston rod end of the reciprocatory motor is connected to a yoke which encloses the two paths of the drive belt, which yoke comprises two ratchet devices operating in opposite directions in relation to each other, and in which one of the ratchet devices, at the active expelling stroke of the piston, provides a clamping of the drive belt between said ratchet means and the inner surface of the yoke and thereby a driving of the drive belt corresponding to the active stroke of the reciprocatory motor, and in which the second ratchet device, at the return stroke of the piston, provides a driving against the second drive belt path, whereby the drive belt will move in one and the same direction at both piston movements, and whereby the two pulleys will rotate in one and the same direction.

In a preferred embodiment of the invention the inner surfaces of the yoke are formed with a friction increasing surface structure.

For eliminating the very little interruption of the driving of the drive belt which may appear during the change of actuation between the two drive belt paths, the apparatus according to the invention can be formed with two or more axial motors, which are mounted parallelly to each other, and which act on the same rotary shaft, and in which the yokes of the two or more apparatus are displaced in relation to each other by a little distance, corresponding to said interruption of the drive force, so that at least one of the drive belts always actuates the output rotary motor, and whereby any interruption of the driving is eliminated.

The drive apparatus can be formed as a twin arrangement comprising two parallely pneumatic cylinders, or two reciprocatable motors mounted opposed to each other. It is also possible to form the apparatus with several reciprocatable motors mounted in a star like arrangement. It is also possible to provide a gear reduction of the output rotary movement by interconnecting cog wheels of the output rotary shafts of two axial-to-rotary motors according to the invention using an interconnecting third cog wheel, preferably a surrounding cog wheel formed with inner cogs, whereby the rotary force can be received and taken out from one of the two primary shafts and/or from the common gear reduced secondary shaft.

BRIEF DESCRIPTION OF THE DRAWINGS

Now the invention is to be described more closely in connection to a number of embodiments thereof, which are shown in the accompanying drawings.

DETAILED DESCRIPTION OF THE INVENTION

Figure 1:
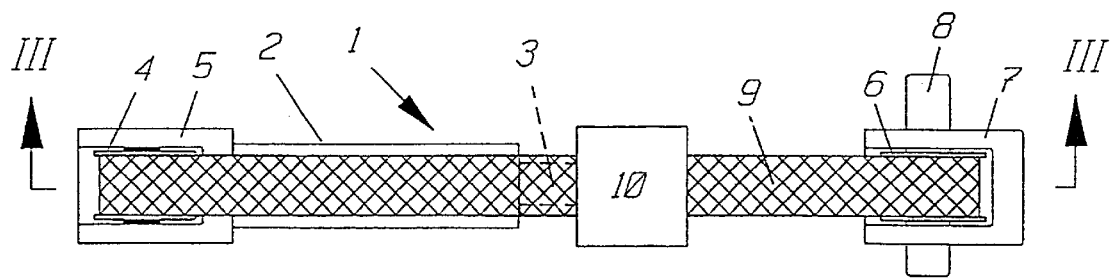
FIG. 1 shows a top plan view or a simple embodiment of an axial-to-rotary motor according to the invention.

It is to be understood that the illustrated embodiments shown in the drawings are only of exemplifying nature, and that many different modifications may be presented within the scope of the appended claims. It is also to be understood that the specification and the claims, notwithstanding the fact that a pneumatic motor is specifically mentioned, may also include reciprocatory motors like gas motors or hydraulic motors.

The pneumatic axial-to-rotary motor shown in FIG. 1 comprises a pneumatic piston-cylinder apparatus 1 including a stationary cylinder 2 and a reciprocatable piston rod 3. The cylinder 2 carries, at the free end thereof, a roll or pulley 4 in a roll carrier 5. A second roll or pulley 6 is mounted in a stationary roll carrier 7 spaced from the pneumatic piston-cylinder apparatus 1. The first roll 4, or in the illustrated case the second roll 6, or both rolls are formed with a rotary output shaft 8. An endless belt 9 extends over the two rolls 4 and 6, which belt can be a cog belt, a V-belt, a fluted or otherwise formed belt having a friction increasing outer surface. The belt provides an upper and a lower belt path 9*a* and 9*b*, respectively. The two belt paths 9*a* and 9*b* are enclosed by a yoke 10 which is fixed mounted at the outer end of the piston rod 3, and which is formed with an upper and a lower outer frame part 11*a* and 11*b*, respectively, inside which frame parts 11*a* and 11*b* the belt 9*a* and 9*b* is slideable. Inside the yoke there is mounted a double acting ratchet means comprising an upper, angularly formed ratchet 12 which is rotatable about a pin 13 at the end of the yoke which is located closest to the piston rod 3, and a second (lower) angularly formed ratchet 14 which is rotatable over a pin 15 adjacent the opposite end of the yoke. The ratchets 12 and 14 are actuated by a double acting spring 16 provided between said ratchets.

Figure 4:
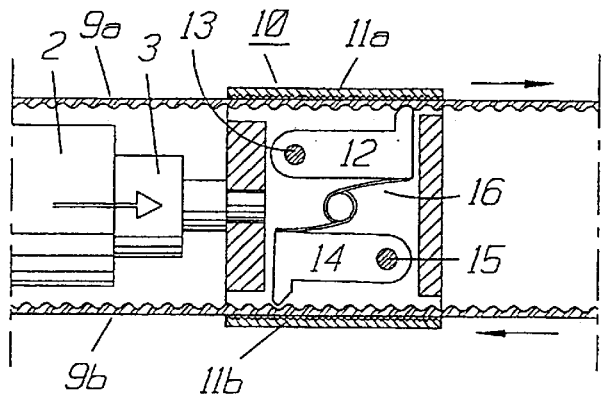
FIG. 4 is an enlarged view of a yoke formed with ratchet means.
Figure 5:
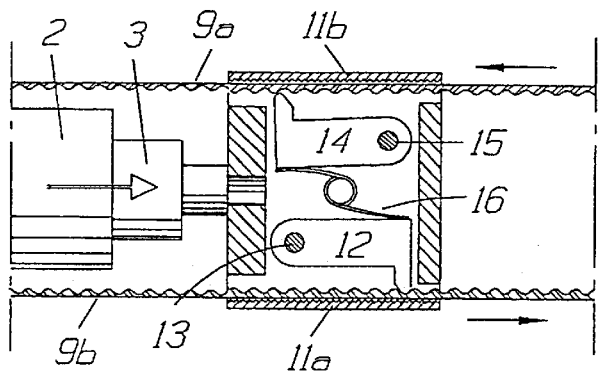
FIG. 5 shows, like in FIG. 4, a yoke having ratchet means, which yoke has been rotated 180° about the longitudinal axis of the motor, whereby the drive function has been reversed.
Figure 6:
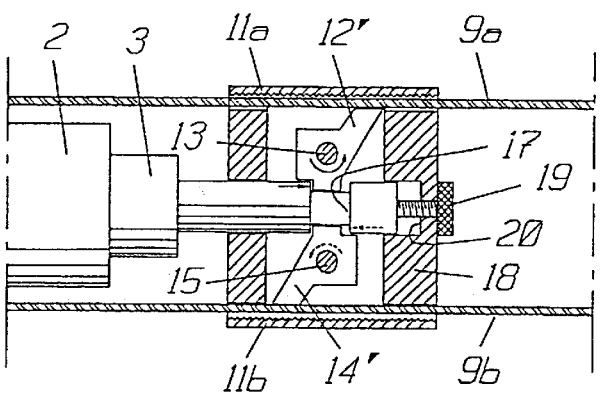
FIG. 6 shows an axial cross, section through an alternative embodiment of a yoke having ratchet means and belonging to an axial-to-rotary motor according to the invention.

Depending on the shape and the position of bearing of the ratchets 12 and 14 the upper ratchet 12 is pressed into engagement with inner surface of the belt 9 when the piston is being expelled, by a pressure which is proportional to the load which is applied to the rotary shaft 8 or shafts, and which is increased to the same extent as the increase of the load on the rotary shaft. The belt path 9*a* is thereby pressed into contact with inner surface of the upper outer frame part 11*a* and is kept in locked engagement with same. The belt can be formed with a friction increasing surface covering, and the inner surface of the outer frame can be chamfered or can be correspondingly formed with a friction increasing surface covering (as shown in FIGS. 4–6). The ratchet 14 mounted underneath said active upper ratchet 12 will be trailed without any force against the inner surface of lower path 9*b* of the belt 9. See FIG. 4.

When the piston rod 3 has completed a full stroke out of the cylinder 2 and inverts direction to be withdrawn into the cylinder the lower ratchet 14 will correspondingly press the belt path 9*b* against the lower outer frame part 11*b*, and the upper ratchet 12 will, free of force, be trailed sliding over the upper belt path 9*a*. See FIG. 5.

Figure 3:
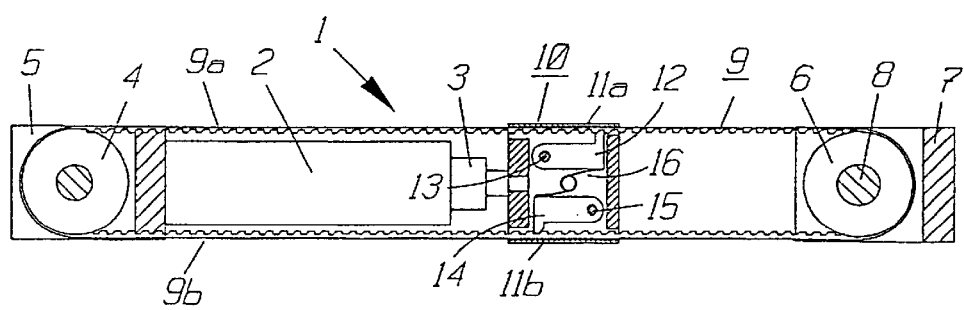
FIG. 3 is a cross section following line III—III of FIG. 1.

As an alternative to the ratchet apparatus shown in FIGS. 3, 4 and 5 the yoke can be formed with a positively controlled ratchet apparatus as shown in FIG. 6. In this case the piston rod 3 is formed with a groove or race 17 in which two opposed ratchets 12' and 14' are mounted with the inner ends thereof rotatable about rotation pins 13, 15, and in which the piston rod 3 is displaceable a limited distance in bore 20 at an end 18 of the yoke, which distance can be set by means of a set screw 19.

When the piston rod 3 is expelled the end thereof is pressed towards the bottom of the bore cavity 20 of the yoke end 18, and the upper ratchet 12' is pressed into contact with the upper belt path 9*a* and the upper outer frame part 11*a*, whereas the lower ratchet 14' is lifted from contact with the lower belt path 9*b*. When the: piston rod 3 is retracted it is moved some distance in relation to the yoke 10, which retraction movement is restricted by the set screw 19. Thereby the lower ratchet 14' is pressed into contact with the lower belt path 9*b*, whereas the upper ratchet 12' is lifted from contact with the upper belt path 9*a*.

By forming the yoke rotatable about its longitudinal axis it is possible to invert the direction of the movement of the drive belt 9. In FIG. 4 is shown that the drive belt 9 is operated in clockwise direction (see the arrows at the belt paths 9*a* and 9*b*). In this case the yoke 10 is arranged rotatable over 180° about a longitudinal axis, and in FIG. 5 the yoke is shown rotated accordingly. This means that—the driving of the drive belt 9 is made in the opposite direction, that is in the counter-clockwise direction, as shown with the arrows in FIG. 5. In both cases there is only shown the function upon expelling of the piston rod 3, but it is obvious that the same reversing function is obtained when the piston rod 3 is retracted.

At the moment when the piston changes operation from expelling to retraction there will be a short moment when the drive force on the belt 9 is interrupted, namely the moment when the drive force changes from acting on one ratchet 12 to acting on the other ratchet 14. For many purposes said short moment of interruption of drive force is not important, especially since the rotary shaft 8 is generally connected to some means giving a fly wheel effect that overbridges said lack of drive force.

For eliminating, however, eventual problems depending on the short moment of lack of drive force on the drive belt 9, the apparatus can be formed with two or more pneumatic axial motors acting on one common output rotary shaft 8, but in which the yokes 10*a* and 10*b* are displaced a slight distance in relation to each other on the drive belts 9*a*, 9*b*. Thereby the changing of operation from expelling and retracting of the piston rods 3*a* and 3*b*, and vice versa, takes place at different moments, so that the rotary shaft 8 is constantly subjected to a drive force, either from the firs-t drive belt or from the second drive belt, or from both drive belts at the same time.

Figure 2:
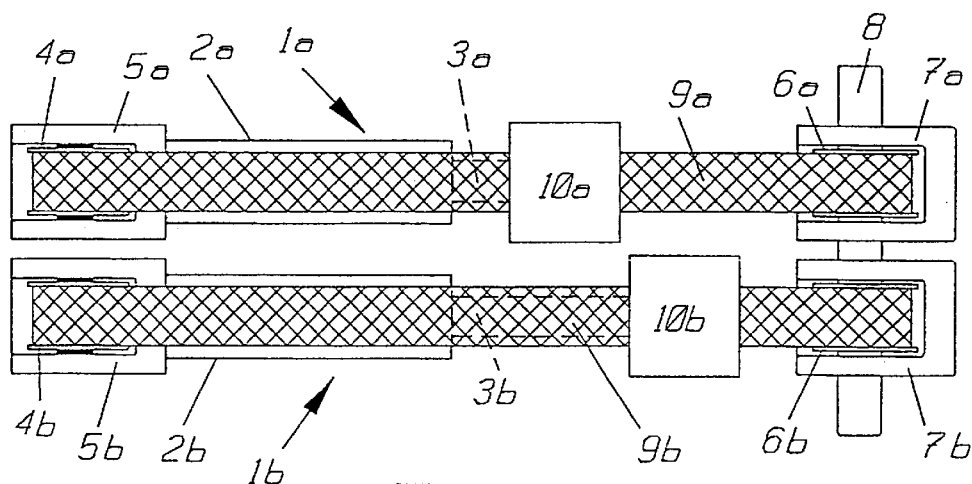
FIG. 2 shows a twin arrangement of the same type or apparatus with the motors arranged parallelly to each other and acting on a common output rotary shaft.
Figure 7:
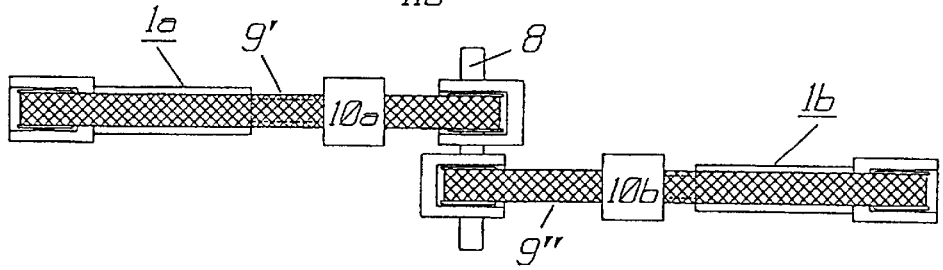
FIG. 7 shows a twin mounted arrangement of motors according to the invention with the motors arranged diametrically opposed and acting on a common rotary shaft.

In FIG. 2 is shown how the pneumatic axial motors are provided parallelly to each other. It is alternatively possible to mount the axial motors diametrically opposed to each other, as shown in FIG. 7, or in any other angular position in relation to each other.

Figure 8:
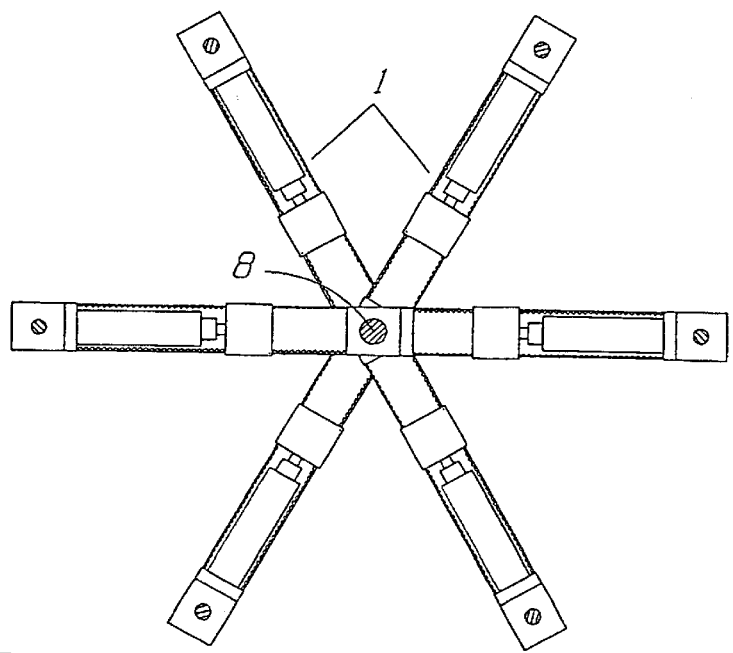
FIG. 8 shows an arrangement comprising six motors according to the invention acting on a common rotary shaft and mounted in a star formation.
Figure 9:
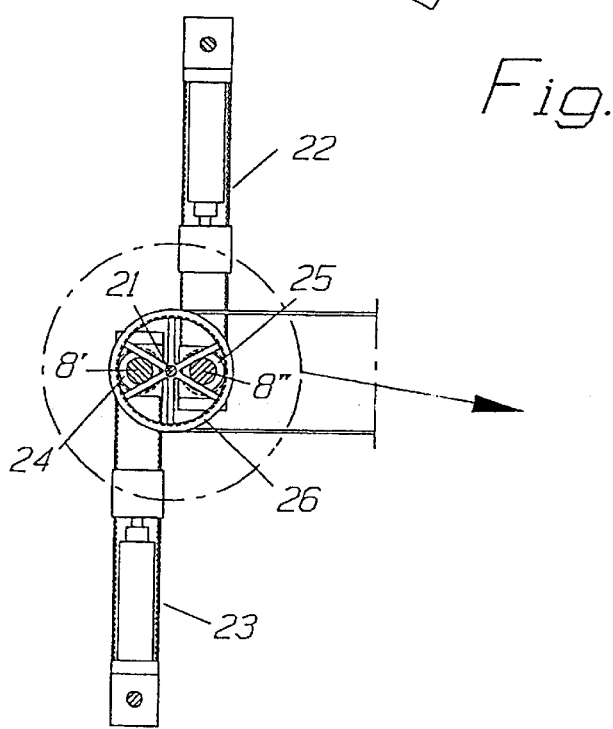
FIG. 9 shows a twin arrangement of two mutually opposed motors according to the invention, each acting on a separate rotary shaft having an outer cog wheel but with said outer cog wheels interconnected by an enclosing cog wheel having inner cogs.

For providing a very high torque on the output rotary shaft 8 several axial motors can be connected to one and the same output shaft, for instance six axial motors which are mounted in a star formation, as shown in FIG. 8.

Figure 10:
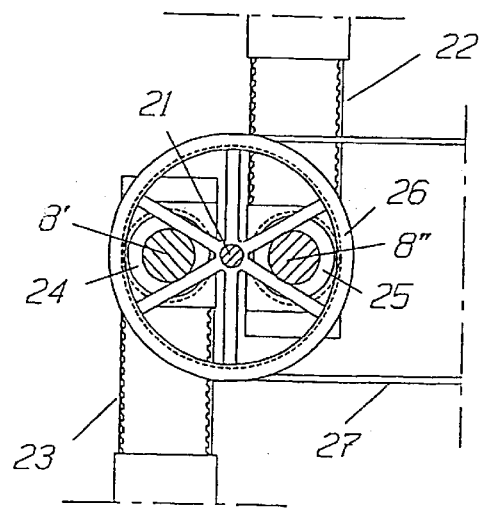
FIG. 10 shows the encircled part of FIG. 9 in a greater scale.

According to a further alternative for providing a very high torque on the output shaft 21 two axial-to-rotary motors 22 and 23 are mounted opposed to each other, or parallelly to each other, each having an outer cog wheel 24 and 25, respectively, and said two cog wheels co-operate with a surrounding wheel 26 having inner cogs, and the shaft 21 of which, is a gear reduced axis for the two motors 22 and 23 according to the invention. In this embodiment of the invention it is possible to receive power either from any of the inner cog wheels 24 or 25, or from both inner cog wheels, or from the surrounding outer cog wheel providing the common, gear reduced shaft 21, or any combination thereof. It is also possible to connect a drive belt to the outer periphery of the surrounding outer cog wheel 26 having inner cogs as shown in FIG. 10.

What is claimed is:

1. An apparatus for transforming an axial reciprocating movement of a reciprocatable motor of a piston-cylinder arrangement, to a continuous rotary movement of one or more output shafts comprising:

an endless drive belt which extends over a first pulley, which said first pulley is fixedly mounted in relation to the reciprocatable motor, and which said drive belt extends over a second pulley which is mounted spaced from a piston rod of said reciprocatable motor so as to define two paths of the drive belt between the first and second pulleys;

a yoke to which the piston rod end of the reciprocatable motor is connected, which said yoke encloses two paths of the drive belt; and a ratchet means enclosed by said yoke which (a) provides a drive force against one of the drive belt paths at an active expelling stroke of the piston rod, and (b) provides a drive force against the second drive belt path at a retraction stroke of the piston rod, whereby the drive belt moves endlessly in one direction from both piston rod movement directions, and whereby the output shaft rotates in one rotational direction, and wherein the ratchet means comprises two ratchets devices which are rotatably mounted such that said ratchets devices, at the movements of the piston rod, are pressed into contact with the drive belt which is, in turn, pressed into contact with an outer frame of the yoke by a force which is created by the movements of the piston rod, and which force is increased by an increased counter force of the output shaft or the output shafts; and wherein inner sides of the outer frames of the yoke, and an outer surface of the drive belt are formed with respective friction increasing structures.

2. Apparatus according to claim 1, wherein the ratchets devices are biased in a direction towards the drive belt by a spring, whereby a first one of said ratchet devices is positively actuated when the piston rod provides the active expelling stroke, whereas a second one of said ratchet devices is positively actuated when the piston rod provides the active retraction stroke.

3. Apparatus according to claim 1, wherein the yoke is arranged to be rotated over 180° in the longitudinal direction thereof, whereby the ratchet devices exchange positions and the driving direction of the drive belt is reversed.

4. Apparatus according to claim 1, further comprising two or more reciprocatable motors arranged to act on one and the same output shaft.

5. Apparatus according to claim 4, wherein there are two respective yokes and drive belts for the two or more reciprocatable motors which said yokes are mounted slightly displaced in the longitudinal direction in relation to each other, so that at least one of the respective said drive belts is always creating a drive force onto the output shaft or shafts, whereby this eliminates the slight interruption of driving which appears when the reciprocatable motor changes operation from an expelling of the piston rod to a retracting thereof.

6. Apparatus according to claim 4, wherein the two reciprocatable motors are mounted parallelly to each other and aside of each other.

7. Apparatus according to claim 4, further comprising three or more reciprocatable motors mounted in a star formation.

8. Apparatus according to claim 1:

further comprising two or more reciprocatable motors, wherein each of the reciprocatable motors is arranged to actuate a separate said output shaft, and wherein each said output shaft is formed with a shaft cog wheel with inner cogs, and in that a common cog wheel having inner cogs is mounted surrounding and co-operating with the shaft cog wheels of the output shafts, whereby the shaft of the outer, surrounding cog wheel having inner cogs provides a gear reduction of the rotation speed at the outer cog wheels.

9. Apparatus according to claim 1, wherein the ratchets devices are positively operated in a race of the piston rod, and that the piston rod is displaceable a limited and adjustable distance in the yoke, whereby a first one of said ratchet devices is positively actuated when the piston rod provides the active expelling stroke, whereas a second one of said ratchet devices is positively actuated when the piston rod provides the active retraction stroke.

10. Apparatus according to claim 4, wherein the two reciprocatable motors are mounted opposed to each other.

11. An apparatus for transforming an axial reciprocating movement of a reciprocatable motor of a piston-cylinder arrangement, to a continuous rotary movement of one or more output shafts comprising:

an endless drive belt which extends over a first pulley, which said first pulley is fixedly mounted in relation to the reciprocatable motor, and which said drive belt extends over a second pulley which is mounted spaced from a piston rod of said reciprocatable motor so as to define two paths of the drive belt between the first and second pulleys;

a yoke to which the piston rod end of the reciprocatable motor is connected, which said yoke encloses two paths of the drive belt; and a ratchet means enclosed by said yoke which (a) provides a drive force against one of the drive belt paths at an active expelling stroke of the piston rod, and (b) provides a drive force against the second drive belt path at a retraction stroke of the piston rod, whereby the drive belt moves endlessly in one direction from both piston rod movement directions, and whereby the output shaft rotates in one rotational direction, and wherein the ratchet means comprises two ratchets devices which are rotatably mounted such that said ratchets devices, at the movements of the piston rod, are pressed into contact with the drive belt which is, in turn, pressed into contact with an outer frame of the yoke by a force which is created by the movements of the piston rod, and which force is increased by an increased counter force of the output shaft or the output shafts; and further comprising two or more reciprocatable motors arranged to act on one and the same output shaft.

12. Apparatus according to claim 11, wherein inner sides of the outer frames of the yoke, and an outer surface of the drive belt are formed with respective friction increasing structures.

13. Apparatus according to claim 11, wherein the ratchets devices are biased in a direction towards the drive belt by a spring, whereby a first one of said ratchet devices is positively actuated when the piston rod provides the active expelling stroke, whereas a second one of said ratchet devices is positively actuated when the piston rod provides the active retraction stroke.

14. Apparatus according to claim 11, wherein the yoke is arranged to be rotated over 180° in the longitudinal direction thereof, whereby the ratchet devices exchange positions and the driving direction of the drive belt is reversed.

15. Apparatus according to claim 11, wherein there are two respective yokes and drive belts for the two or more reciprocatable motors which said yokes are mounted slightly displaced in the longitudinal direction in relation to each other, so that at least one of the respective said drive belts is always creating a drive force onto the output shaft or shafts, whereby this eliminates the slight interruption of driving which appears when the reciprocatable motor changes operation from an expelling of the piston rod to a retracting thereof.

16. Apparatus according to claim 11, wherein the two reciprocatable motors are mounted parallelly to each other and aside of each other.

17. Apparatus according to claim 11, further comprising three or more reciprocatable motors mounted in a star formation.

18. Apparatus according to claim 11:

wherein each of the reciprocatable motors is arranged to actuate a separate wheel shaft, and wherein each said wheel shaft is formed with a shaft cog wheel with inner cogs, and in that the output shaft has a common cog wheel having inner cogs is mounted surrounding and cooperating with the shaft cog wheels of the wheel shafts, whereby the output shaft of the outer, surrounding cog wheel having inner cogs provides a gear reduction of the rotation speed at the outer cog wheels.

19. Apparatus according to claim 11, wherein the two reciprocatable motors are mounted opposed to each other.

20. Apparatus according to claim 11, wherein the ratchets devices are positively operated in a race of the piston rod, and that the piston rod is displaceable a limited and adjustable distance in the yoke, whereby a first one of said ratchet devices is positively actuated when the piston rod provides the active expelling stroke, whereas a second one of said ratchet devices is positively actuated when the piston rod provides the active retraction stroke.

* * * * *